US009686908B2

United States Patent
Mead et al.

(10) Patent No.: US 9,686,908 B2
(45) Date of Patent: Jun. 27, 2017

(54) SEED BOOT MOUNTING

(71) Applicant: AGCO-Amity JV, LLC, Fargo, ND (US)

(72) Inventors: Leonard Carl Mead, Walcott, ND (US); Nicholas W. Schrapp, Grand Rapids, MN (US); Collin David Miller, Mapleton, ND (US)

(73) Assignee: AGCO-AMITY JV, LLC, Fargo, ND (US)

( * ) Notice: Subject to any disclaimer, the term of this patent is extended or adjusted under 35 U.S.C. 154(b) by 43 days.

(21) Appl. No.: 14/655,308

(22) PCT Filed: Dec. 18, 2013

(86) PCT No.: PCT/US2013/076085
§ 371 (c)(1),
(2) Date: Jun. 24, 2015

(87) PCT Pub. No.: WO2014/105560
PCT Pub. Date: Jul. 3, 2014

(65) Prior Publication Data
US 2015/0334915 A1    Nov. 26, 2015

Related U.S. Application Data

(60) Provisional application No. 61/746,396, filed on Dec. 27, 2012.

(51) Int. Cl.
*A01C 5/06*     (2006.01)
*A01C 7/20*     (2006.01)
(Continued)

(52) U.S. Cl.
CPC ............. *A01C 7/201* (2013.01); *A01C 5/064* (2013.01); *A01C 7/206* (2013.01); *F16C 11/04* (2013.01);
(Continued)

(58) Field of Classification Search
CPC ......... A01C 7/201; A01C 5/064; A01B 23/06; A01B 15/16; E05D 7/0027; E05D 7/08;
(Continued)

(56) References Cited

U.S. PATENT DOCUMENTS 708,896 A * 9/1902 Mathis ............................ 138/89
718,885 A * 1/1903 Stephenson ............ A01B 15/16
172/560
(Continued)

FOREIGN PATENT DOCUMENTS

CA        2411041 A1    5/2004
DE        29714900 U1    11/1997
(Continued)

OTHER PUBLICATIONS

International Search Report and Written Opinion, dated Jun. 18, 2014 for corresponding International Application No. PCT/US2013/076085, filed Dec. 18, 2013.

*Primary Examiner* — John G Weiss
(74) *Attorney, Agent, or Firm* — Mai-Tram D. Lauer; Westman Champlin & Koehler, P.A.

(57) ABSTRACT

An apparatus includes a hinge mount top plate, a hinge mount bottom plate, and a pin connecting the top plate and bottom plate. A cam adjuster element includes a top aperture, a middle aperture, and a bottom aperture. A first fastener passes through the top aperture to connect the cam adjuster element to the hinge mount top plate. The first fastener may be disposed in different positions in the top aperture. A second fastener passes through the middle aperture to connect the cam adjuster element to the hinge mount top plate. The cam adjuster element may pivot about a longitudinal axis of the second fastener. The pin is retained in the bottom aperture. An assembly includes a disc, a seed boot, and a mounting mechanism that allows for movement (Continued)

between the seed boot and the disc about first pivot axis and second pivot axis.

20 Claims, 7 Drawing Sheets

(51) Int. Cl.
  *A01B 23/06* (2006.01)
  *F16C 11/04* (2006.01)
(52) U.S. Cl.
  CPC ........ *Y10T 16/53864* (2015.01); *Y10T 16/547* (2015.01); *Y10T 16/5478* (2015.01)
(58) Field of Classification Search
  CPC ............. E05D 7/0045; Y10T 16/53864; Y10T 16/547; Y10T 16/5478; F16C 11/04
  USPC .......... 172/558, 566; 16/243, 244, 235, 256; 111/157, 163
  See application file for complete search history.

(56) References Cited

U.S. PATENT DOCUMENTS

| | | | |
|---|---|---|---|
| 840,396 A * | 1/1907 | Suter | 16/256 |
| 1,026,409 A | 5/1912 | Schutt | |
| 1,026,410 A | 5/1912 | Schutt | |
| 1,037,303 A | 9/1912 | Pattison et al. | |
| 1,054,235 A | 2/1913 | Pattison et al. | |
| 1,056,386 A | 3/1913 | Wheeler | |
| 1,061,499 A | 5/1913 | Rieske | |
| 1,061,517 A | 5/1913 | Beeman et al. | |
| 1,107,442 A | 8/1914 | Peckham | |
| 1,113,773 A | 10/1914 | Garrity | |
| 1,248,953 A * | 12/1917 | Treadwell | A01B 23/06 172/566 |
| 1,311,773 A * | 7/1919 | Ray | A01B 23/06 172/518 |
| 1,837,347 A * | 12/1931 | Vandine | A01B 23/06 172/558 |
| 2,730,940 A * | 1/1956 | Rimple | A01B 23/06 172/220 |
| 2,917,012 A * | 12/1959 | Oehler | A01O 5/064 111/157 |
| 4,196,679 A | 4/1980 | Moore | |
| 4,217,835 A | 8/1980 | Fox | |
| 4,760,806 A | 8/1988 | Bigbee et al. | |
| 4,998,488 A | 3/1991 | Hansson | |
| 5,092,255 A | 3/1992 | Long et al. | |
| 5,678,500 A | 10/1997 | Schmidt | |
| 6,209,466 B1 | 4/2001 | Wodrich | |
| 6,386,127 B1 * | 5/2002 | Prairie | A01B 71/02 111/167 |
| 7,168,376 B2 | 1/2007 | Johnston | |
| 7,357,193 B2 * | 4/2008 | Harmon | A01B 23/06 172/566 |
| 7,497,174 B2 | 3/2009 | Sauder et al. | |
| 7,540,246 B2 | 6/2009 | Friesen et al. | |
| 7,685,950 B2 | 3/2010 | Friesen | |
| 7,856,934 B2 | 12/2010 | Hagny | |
| 7,984,768 B2 * | 7/2011 | Schilling | A01B 23/06 172/566 |
| 8,201,507 B2 | 6/2012 | Sauder et al. | |
| 8,783,375 B2 * | 7/2014 | Naylor | A01B 23/06 172/558 |
| 2011/0232552 A1 | 9/2011 | Schilling et al. | |
| 2012/0145057 A1 | 6/2012 | Hagny | |

FOREIGN PATENT DOCUMENTS

| | | |
|---|---|---|
| EP | 2227930 A1 | 9/2010 |
| WO | 2010138068 A1 | 12/2010 |

* cited by examiner

SEED BOOT MOUNTING

CROSS-REFERENCE TO RELATED APPLICATION

This Application is a Section 371 National Stage Application of International Application No. PCT/US2013/076085, filed Dec. 18, 2013 and published as WO/2014/105560 on Jul. 3, 2014, in English. International Application No. PCT/US2013/076085 claims the benefit of priority from U.S. Provisional Application No. 61/746,396, filed Dec. 27, 2012. The content of each of the applications recited in this section is hereby incorporated by reference in its entirety.

BACKGROUND

In modern agricultural seeding operations, a tractor typically pulls a plurality of furrow cutting and seeding units across a field to plant multiple rows of seeds simultaneously. Each row unit is designed to open a seed furrow, deposit seeds within the seed furrow, and close the furrow around the seeds by moving the displaced dirt back into the furrow. A common furrow opener is a disc. A seed is typically supplied from a reservoir to a seed tube with an opening near the bottom of the disc. The seed tube is positioned adjacent the disc to drop the seed into the furrow.

An air seeder is commonly used in automated planting operations. The air seeder carries seed, fertilizer and possibly other chemicals in a reservoir in communication with a pneumatic conveyance system. The pneumatic conveyance system uses air flow at such a velocity that the seeds and/or fertilizer are entrained into the air stream and are thereby conveyed through the seed tube or other tubes. Metering mechanisms control the flow of seed and fertilizer through the pneumatic conveyance system to control the rate of application of seed and fertilizer to the ground.

Discs or openers are designed to move through the soil to open furrows for the placement of product such as seed, fertilizer, or other micro nutrients into the ground while creating as little disturbance as possible to the surrounding environment. It is desirable that a seed boot and disc are positioned closely adjacent each other to reduce the amount of debris that can come between them. Entry of dirt and other debris between the seed boot and disc can cause clogging that can prevent the disc from rotating as desired. Moreover, in case debris does enter a space between the seed boot and disc, it is beneficial to be able to clean the debris from the space.

SUMMARY

In one aspect, an apparatus comprises a hinge mount top plate, a hinge mount bottom plate, and a pin connecting the hinge mount top plate and the hinge mount bottom plate. A cam adjuster element comprises a top aperture, a middle aperture, and a bottom aperture. A first fastener passes through the top aperture to connect the cam adjuster element to the hinge mount top plate. The first fastener may be disposed in different positions in the top aperture. A second fastener passes through the middle aperture to connect the cam adjuster element to the hinge mount top plate. The cam adjuster element may pivot about a longitudinal axis of the second fastener. A pin is retained in the bottom aperture.

In another aspect, an assembly comprises a disc, a seed boot comprising a seed tube and a scraper, and a mounting mechanism connecting the seed boot and the disc. The mounting mechanism allows for movement between the seed boot and the disc about first and second pivot axes.

This disclosure, in its various combinations, may also be characterized by the following listing of items:

1. An apparatus comprising:
a hinge mount top plate;
a hinge mount bottom plate;
a pin connecting the hinge mount top plate and the hinge mount bottom plate;
a cam adjuster element comprising a top aperture; a middle aperture, and a bottom aperture;
a first fastener passing through the top aperture to connect the cam adjuster element to the hinge mount top plate, wherein the first fastener may be disposed in different positions in the top aperture;
a second fastener passing through the middle aperture to connect the cam adjuster element to the hinge mount top plate, wherein the cam adjuster element may pivot about a longitudinal axis of the second fastener; and
wherein the pin is retained in the bottom aperture.

2. The apparatus of item 1 further comprising a biasing device that biases the hinge mount bottom plate relative to the hinge mount top plate.

3. The apparatus of item 2 wherein the biasing mechanism is a spring.

4. The apparatus of item 3 wherein the spring is a helical coil spring, and wherein the pin passes through a coil of the spring.

5. The apparatus of item 4 wherein the helical coil spring comprises first and second end arms, wherein the first end arm is positioned against the hinge mount top plate and wherein the second end arm is positioned against the hinge mount bottom plate.

6. The apparatus of any one of items 1-5 further comprising a pin retainer that retains a head of the pin in the bottom aperture.

7. The apparatus of item 6 wherein the pin retainer comprises:
a first aperture through which the first fastener passes; and
second aperture through which the second fastener passes.

8. An assembly comprising:
a disc;
a seed boot comprising a seed tube and a scraper; and
a mounting mechanism connecting the seed boot and the disc, the mounting mechanism allowing for movement between the seed boot and the disc about first and second pivot axes.

9. The assembly of item 8 wherein the mounting mechanism comprises:
a hinge mount top plate connected to the disc;
a hinge mount bottom plate connected to the seed boot; and
a pin connecting the hinge mount top plate and the hinge mount bottom plate, wherein the first pivot axis is along a longitudinal axis of the pin.

10. The assembly of item 9 wherein the mounting mechanism comprises:
a cam adjuster element comprising a top aperture; a middle aperture, and a bottom aperture;
a first fastener passing through the top aperture to connect the cam adjuster element to the hinge mount top plate, wherein the first fastener may be disposed in different positions in the top aperture;
a second fastener passing through the middle aperture to connect the cam adjuster element to the hinge mount top plate, wherein the cam adjuster element may pivot about a longitudinal axis of the second fastener, and wherein the second pivot axis is along the longitudinal axis of the second fastener; and wherein the pin is retained in the bottom aperture.

11. The assembly of any one of items 8-10 wherein the seed boot comprises a back surface that is aligned with and positioned against a face of the disc.

12. The assembly of any one of items 8-11 further comprising a swing stop to limit movement about the first pivot axis.

13. The assembly of any one of items 8-12 further comprising a spindle arm on which the disc is mounted, wherein the mounting mechanism connects the seed boot to the spindle arm.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, leading, trailing, etc., are used, it is to be understood that they are used only for ease of understanding the description. It is contemplated that structures may be oriented otherwise.

DETAILED DESCRIPTION

Figure 1:
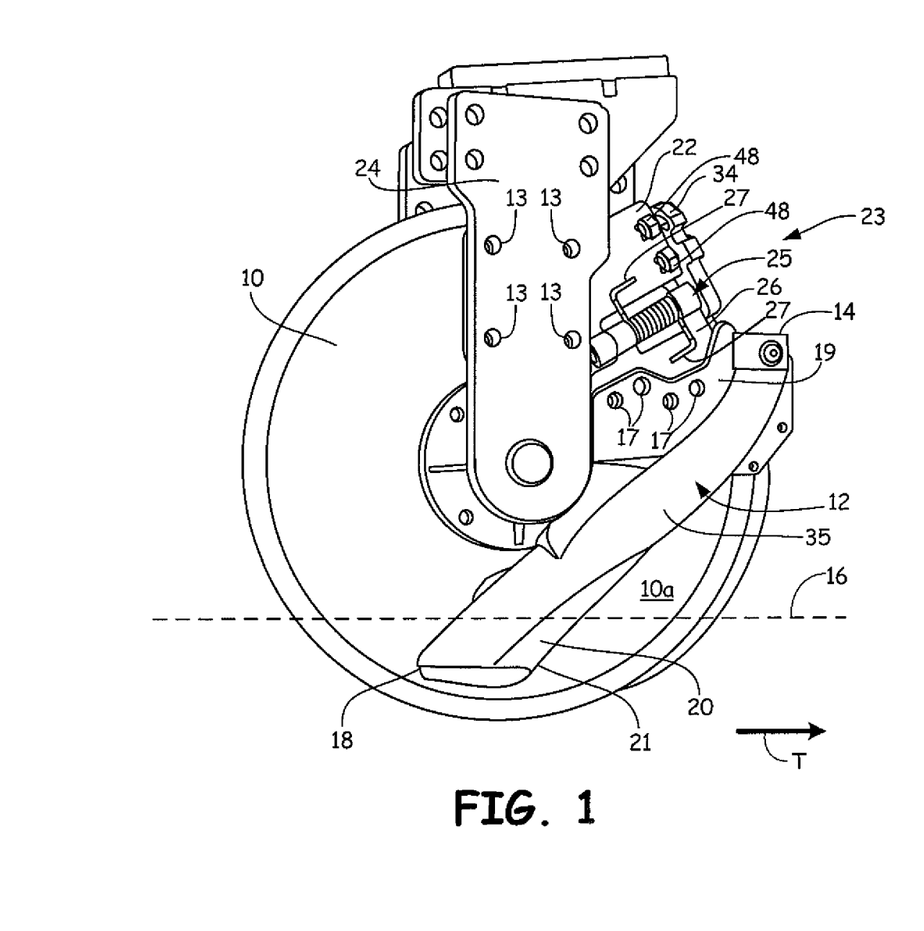
FIG. 1 is a side elevation view of a seed boot mounted on a disc using an exemplary embodiment of a mounting mechanism of the present disclosure.

In modern agricultural practices, automated ground opening and seeding implements are commonly used. One implement for opening furrows in the ground is a disc 10, shown in FIG. 1, which slices a furrow into soil at and below the ground surface 16 as it travels behind a tractor (not shown) in direction T. For purposes of discussion, when the assembly of FIG. 1 moves in travel direction T, the right side of the assembly is referred to the leading side, and the left side of the assembly is referred to the trailing side. FIG. 1 shows disc 10 fitted with a seed boot 12. Typically, disc 10 rotates at an angle relative to the line of travel of direction T to form a furrow or trench in the ground surface 16. Because of the angling of disc 10, the leading face of the disc pushes soil to one side and creates the furrow. Seed boot 12 is mounted beside disc 10 on the trailing side of the disc to keep the furrow open to allow seed deposition therein before the loose soil falls back into the furrow. In an exemplary embodiment, seed boot 12 is positioned to run in the shadow of the leading face to reduce wear on the seed boot and to reduce disturbance of the soil around the furrow. In an exemplary embodiment, seed boot 12 is an integrally cast unit (such as from ductile iron) that comprises seed tube 35 and scraper 20.

A seed travels inside the seed tube 35 from a seed hopper (not shown) through seed inlet 14 and out seed outlet 18 into the furrow cut by the disc 10. Seed boot 12 has an integral scraper 20. To facilitate smooth travel of disc 10 and seed boot 12 through the soil, it is important that the scraper edge 21 rests flat against and adjacent face 10a of disc 10. However, if debris becomes lodged between the scraper 20 and the disc 10, it is also beneficial to be able to move the scraper 20 away from face 10a of disc 10 to clean therebetween.

In one aspect, this disclosure describes a mounting mechanism 23 with a biasing device that biases the hinge mount bottom plate 26 relative to the hinge mount top plate 22. In an exemplary embodiment, the biasing mechanism is a spring 30 (see FIG. 2) that acts indirectly on seed boot 12 (via hinge mount bottom plate 26) to urge the scraper 20 against face 10a of disc 10 while also allowing movement of the scraper 20 away from the disc 10. Further, an exemplary embodiment of mounting mechanism 23 comprises a cam adjustment mechanism to close any gap between seed boot 12 and disc 10 at an upper portion of seed boot 12. Thus adjusted, a back surface 31 of seed boot 12 (shown in FIG. 3) is aligned with and positioned against face 10a of disc 10, thereby reducing uneven wear on seed boot 12 or scraper 20 due to uneven alignment with disc 10.

Figure 2:
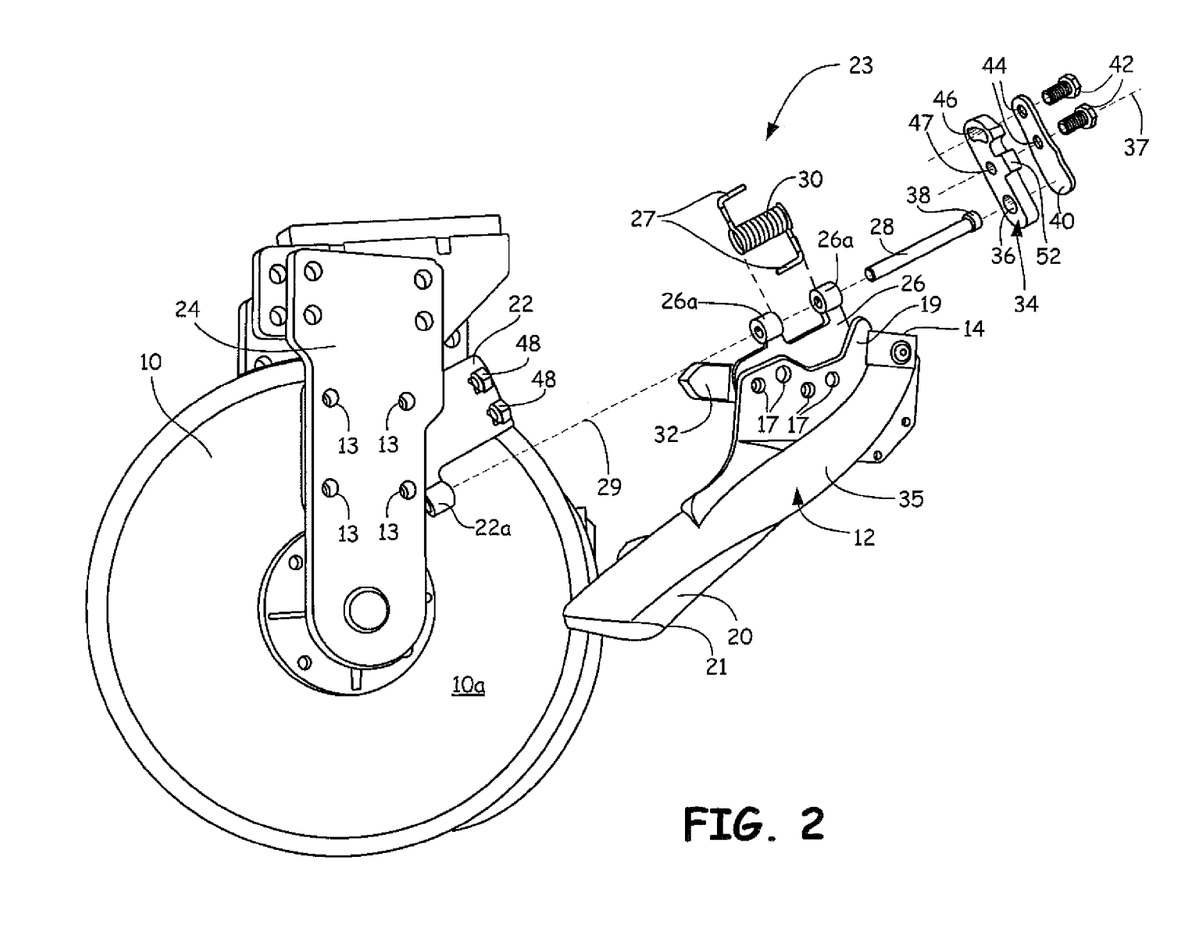
FIG. 2 is an exploded side view of the disc, mounting mechanism, and seed boot.
Figure 3:
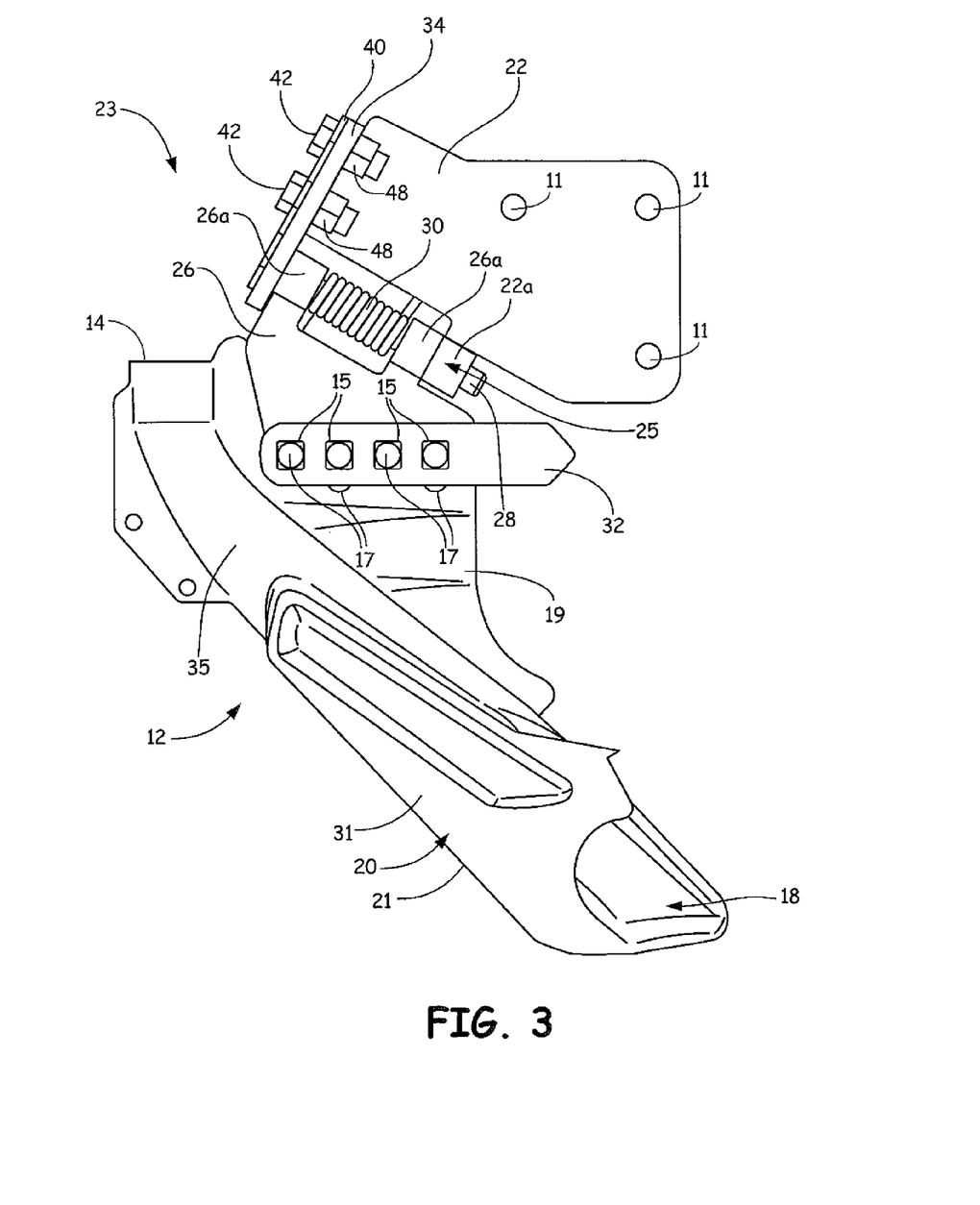
FIG. 3 is a back side elevation view of the exemplary mounting mechanism and seed boot of FIGS. 1 and 2, removed from the disc spindle arm.

As shown in FIG. 2, mounting mechanism 23 comprises a hinge mount top plate 22 attached to a hinge mount bottom plate 26 by pin 28. In an exemplary embodiment, a biasing mechanism is provided at hinge 25 (see FIG. 1) to bias hinge mount bottom plate 26, and therefore a bottom portion of seed boot 12, toward disc 10. In an exemplary embodiment, the biasing mechanism is a helical coil spring 30 that surrounds pin 28 so that pin 28 passes through the coil of spring 30. In an exemplary embodiment, spring 30 includes end arms 27, which are positioned to push against hinge mount top plate 22 and hinge mount bottom plate 26. Hinge mount top plate 22 is attached to spindle arm 24 of disc 10, such as by fasteners known in the art. For example, fasteners (not shown) may be inserted through apertures 11 in hinge mount top plate 22 (visible in FIG. 3) and corresponding apertures 13 in spindle arm 24. Suitable exemplary fasteners include bolts and other known fasteners.

Hinge mount bottom plate 26 is attached to seed boot 12. Hinge mount bottom plate 26 and swing stop 32 comprise a plurality of apertures 15 to mate with corresponding apertures 17 provided on attachment flange 19 of seed boot 12. Because several of each of the sets of apertures 15, 17 are provided in different locations on the applicable parts, a user assembling the mounting mechanism 23 can select from among several positional placements of seed boot 12 relative to hinge mount bottom plate 26 by choosing which of the apertures 15 on hinge mount bottom plate 26 to line up with which of the apertures 17 in attachment flange 19 of seed boot 12. In an exemplary embodiment, attachment flange 19 is integrally cast with the remainder of seed boot 12.

Hinge barrel elements 22a and 26a of hinge mount top plate 22 and hinge mount bottom plate 26, respectively, are attached to each other by pin 28, which passes through hinge barrel elements 22a, 26a and spring 30. In normal operation, spring 30 biases a lower portion of seed boot 12, and therefore scraper 20, against face 10a of disc 10. However, a force sufficient to overcome the spring tension will allow seed boot 12 to pivot upward and outward along the longitudinal axis 29 of pin 28 to allow for the removal of any debris that may become undesirably lodged between disc 10 and scraper 20. Swing stop 32 is mounted to hinge mount bottom plate 26 or is formed integrally therewith. Swing stop 32 limits the movement of hinge mount bottom plate 26 against the inside surface of spindle arm 24 to prevent excessive pivoting of seed boot 12 about the longitudinal axis 29 of pin 28.

Figure 4:
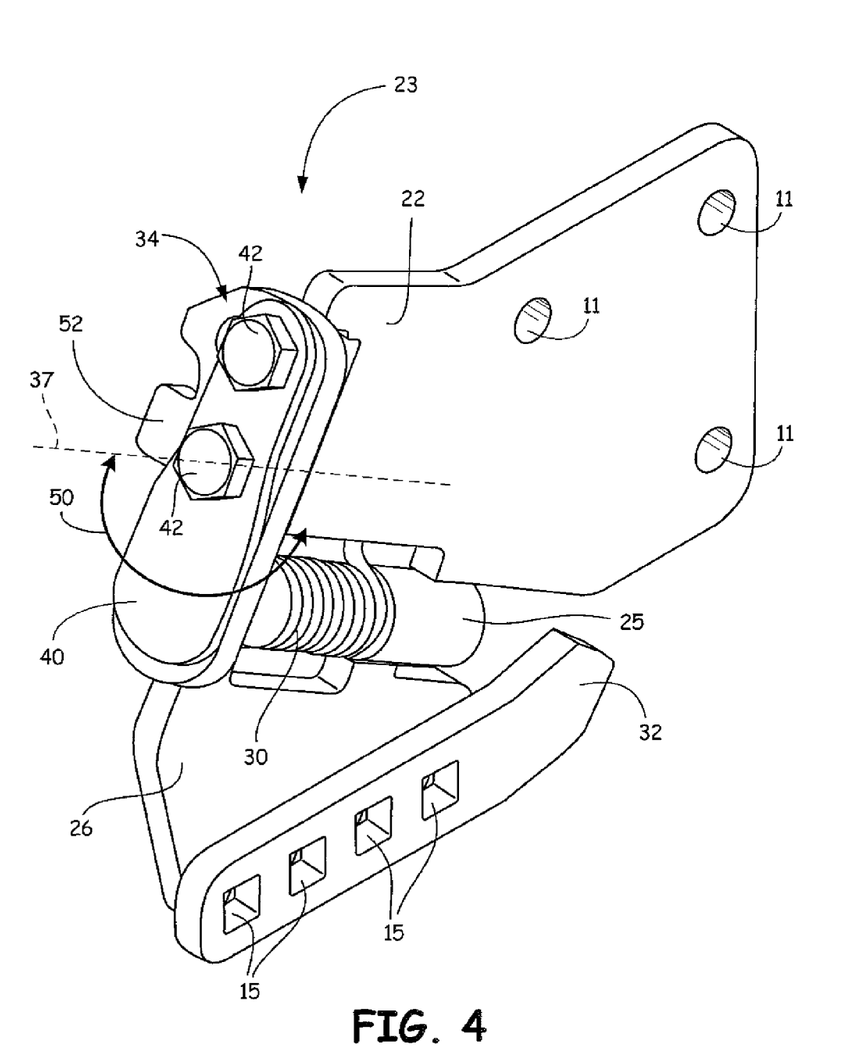
FIG. 4 is a perspective view from a leading and back viewpoint of the mounting mechanism removed from the disc and seed boot.
Figure 5:
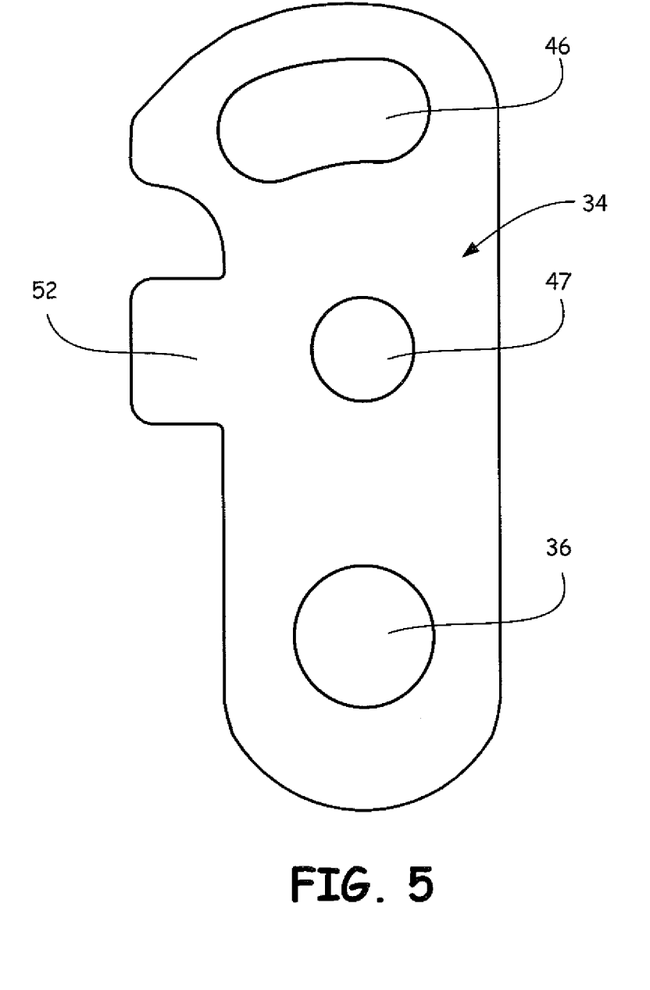
FIG. 5 is a front (leading side) elevation view of an exemplary cam adjuster element of mounting mechanism of FIGS. 1-4.

Cam adjuster element 34 is placed so that bottom aperture 36 surrounds head 38 of pin 28. Pin retainer 40 is secured to retain pin head 38 within aperture 36 of cam adjuster element 34. In an exemplary embodiment, fasteners 42 are inserted through apertures 44 of pin retainer 40 and apertures 46, 47 of cam adjuster element 34 and into nuts 48 of hinge mount top plate 22. As shown in FIG. 5, top aperture 46 has an arcuate slot shape to allow side-to-side movement of fastener 42 therein; accordingly, fastener 42 may be disposed in different positions in top slot aperture 46. Such movement of fastener 42 in top slot aperture 46 causes cam adjuster element 34 to pivot about the longitudinal axis 37 of fastener 42 in center aperture 47. This in turn causes the head side of pin 28 to move as shown by arrow 50 in FIG. 4. Accordingly, top fastener 42 may by loosened, its position in top aperture 46 adjusted, and then top fastener 42 may be retightened. Such adjustment changes the position of pin 28 and therefore of hinge mount bottom plate 26 and its attached seed boot 12. This is useful for closing any gap between a top portion of seed boot 12 and face 10a of disc 10. In an exemplary embodiment, cam adjuster element 34 includes protrusion 52 to facilitate this adjustment. For example, in the illustrated embodiment, protrusion 52 is substantially rectangular for engagement with an open ended wrench.

With the disclosed mounting mechanism 23, movement around two pivot axes is possible. First, the hinge mount bottom plate 26 and its attached seed boot 12 pivot about the longitudinal axis 29 of pin 28 within spring 30. Second, cam adjuster element 34 pivots about the longitudinal axis 37 of fastener 42 in center aperture 47, thereby carrying within its bottom aperture 36 the head 38 of pin 28, which moves as shown by arrow 50 in FIG. 4. Accordingly, positions of both the bottom and top portions of seed boot 12 can be adjusted so that back surface 31 of seed boot 12 is disposed flatly against face 10a of disc 10, thereby facilitating smooth travel of the disc and seed boot assembly through the soil and reducing uneven wear of seed boot 12.

Figure 6:
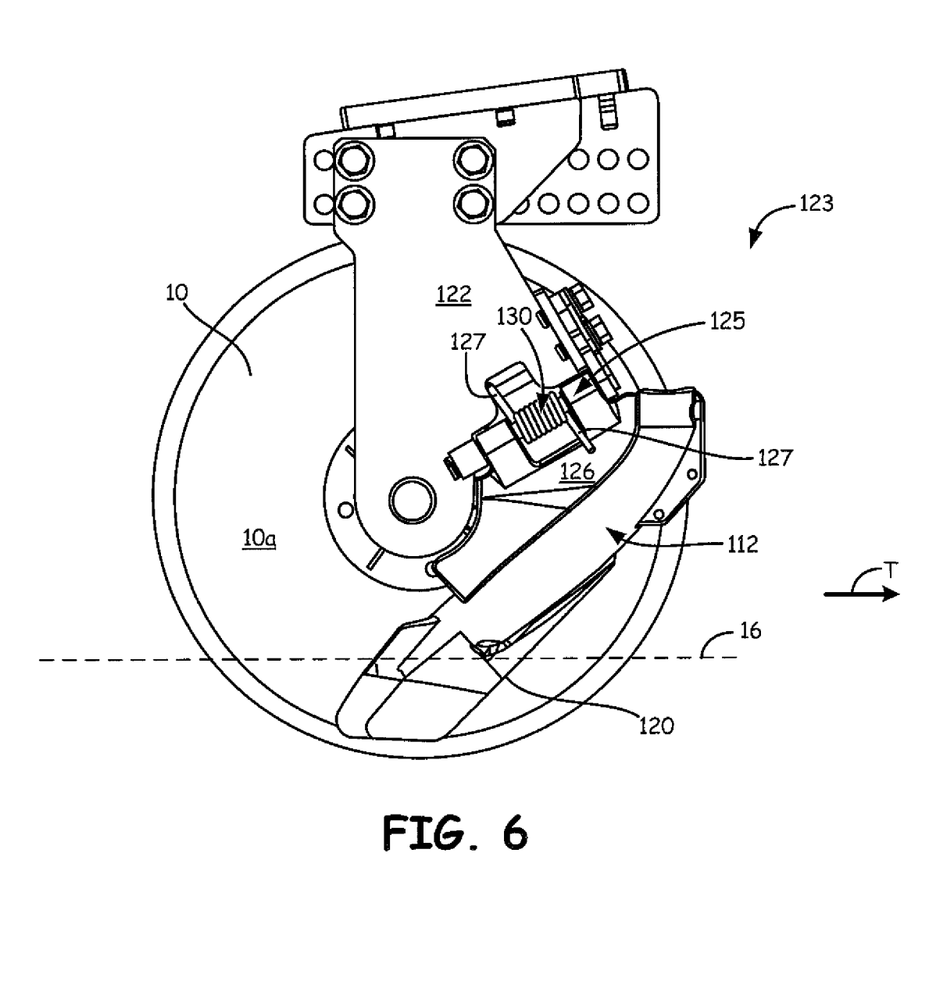
FIG. 6 is a side elevation view of a seed boot mounted on a disc using a second exemplary embodiment of a mounting mechanism of the present disclosure.
Figure 7:
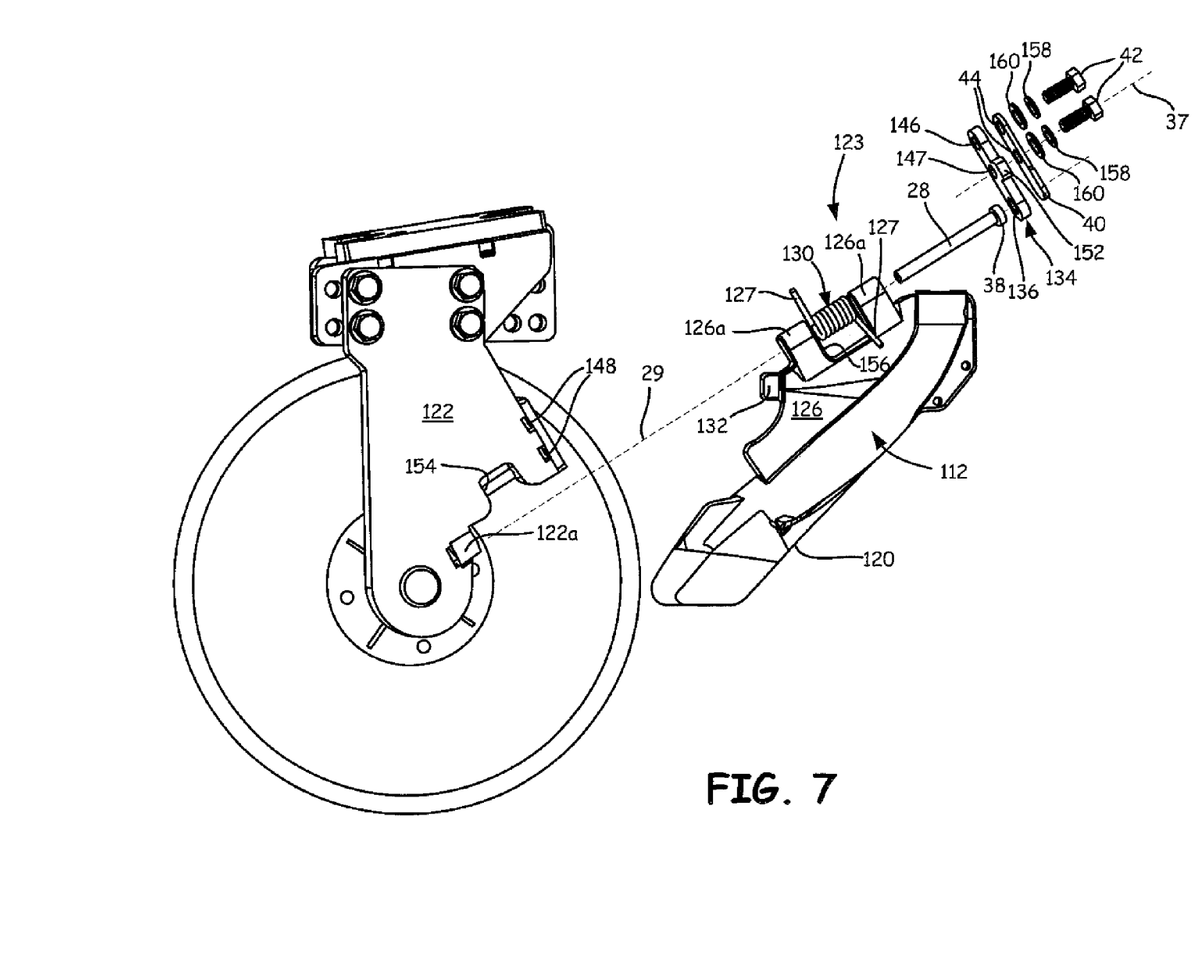
FIG. 7 is an exploded side view of the disc, mounting mechanism, and seed boot of FIG. 6.

FIG. 6 is a side elevation view, and FIG. 7 is an exploded side view, of a seed boot 112 mounted on disc 10 using a second exemplary embodiment of a mounting mechanism 123 of the present disclosure. In mounting mechanism 123, the spindle and hinge mount top plate are integrally formed as hinge mount top plate 122. The seed boot and hinge mount bottom plate are integrally formed as hinge mount bottom plate 126.

In an exemplary embodiment, mounting mechanism 123 includes a biasing device that biases the hinge mount bottom plate 126 relative to the hinge mount top plate 122. In an exemplary embodiment, the biasing mechanism is a spring 130 (see FIG. 7) that acts on seed boot 12 (via hinge mount bottom plate 126) to urge the scraper 120 against face 10a of disc 10 while also allowing movement of the scraper 120 away from the disc 10. Further, an exemplary embodiment of mounting mechanism 123 comprises a cam adjustment mechanism to close any gap between seed boot 112 and disc 10 at an upper portion of seed boot 112. Thus adjusted, a back surface of seed boot 112 is aligned with and positioned against face 10a of disc 10, thereby reducing uneven wear on seed boot 112 or scraper 120 due to uneven alignment with disc 10.

Mounting mechanism 123 comprises a hinge mount top plate 122 attached to a hinge mount bottom plate 126 by pin 28. In an exemplary embodiment, a biasing mechanism is provided at hinge 125 (see FIG. 6) to bias hinge mount bottom plate 126, and therefore a bottom portion of seed boot 112, toward disc 10. In an exemplary embodiment, the biasing mechanism is a helical coil spring 130 that surrounds pin 28 so that pin 28 passes through the coil of spring 130. In an exemplary embodiment, spring 130 includes end arms 127, which are positioned to push against hinge mount top plate 122 and hinge mount bottom plate 126. Hinge mount top plate 122 includes recess 154 in which a spring end arm 127 is positioned. Similarly, hinge mount bottom plate 126 includes recess 156 in which the other spring end arm 127 is positioned. These features assure proper positioning and retention of spring 130 in mounting mechanism 123.

Hinge barrel elements 122a and 126a of hinge mount top plate 122 and hinge mount bottom plate 126, respectively, are attached to each other by pin 28, which passes through hinge barrel elements 122a, 126a and spring 130. In normal operation, spring 130 biases a lower portion of seed boot 112, and therefore scraper 120, against face 10a of disc 10. However, a force sufficient to overcome the spring tension will allow seed boot 112 to pivot upward and outward along the longitudinal axis 29 of pin 28 to allow for the removal of any debris that may become undesirably lodged between disc 10 and scraper 120. Swing stop 132 is formed integrally with hinge mount bottom plate 126. Swing stop 132 limits the movement of hinge mount bottom plate 126 against the inside surface of hinge mount top plate 122 to prevent excessive pivoting of seed boot 112 about the longitudinal axis 29 of pin 28.

Cam adjuster element 134 is placed so that bottom aperture 136 surrounds head 38 of pin 28. Pin retainer 40 is secured to retain pin head 38 within aperture 136 of cam adjuster element 134. In an exemplary embodiment, fasteners 42 are inserted through apertures 44 of pin retainer 40 and apertures 146, 147 of cam adjuster element 134 and into internally threaded bores 148 of hinge mount top plate 122. Top aperture 146 is over-sized to allow side-to-side movement of fastener 42 therein; accordingly, fastener 42 may be disposed in different positions in top aperture 146. Such movement of fastener 42 in top aperture 46 causes cam adjuster element 134 to pivot about the longitudinal axis 37 of fastener 42 in center aperture 147. This in turn causes the head side of pin 28 to move as shown by arrow 50 in FIG. 4. Accordingly, top fastener 42 may by loosened, its position in top aperture 146 adjusted, and then top fastener 42 may be retightened. Such adjustment changes the position of pin 28 and therefore of hinge mount bottom plate 126 and its attached seed boot 112. This is useful for closing any gap between a top portion of seed boot 112 and face 10a of disc 10. In an exemplary embodiment, cam adjuster element 134 includes protrusion 152 to facilitate this adjustment. For example, in the illustrated embodiment, protrusion 152 is substantially rectangular for engagement with an open ended wrench. In the illustrated embodiment, lock washers 158 and washers 160 are also used.

With the disclosed mounting mechanism 123, movement around two pivot axes is possible. First, the hinge mount bottom plate 126 and its attached seed boot 112 pivot about the longitudinal axis 29 of pin 28 within spring 130. Second, cam adjuster element 134 pivots about the longitudinal axis 37 of fastener 42 in center aperture 147, thereby carrying within its bottom aperture 136 the head 38 of pin 28, which moves as shown by arrow 50 in FIG. 4. Accordingly, positions of both the bottom and top portions of seed boot 112 can be adjusted so that a back surface of seed boot 112 is disposed flatly against face 10a of disc 10, thereby facilitating smooth travel of the disc and seed boot assembly through the soil and reducing uneven wear of seed boot 112.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An apparatus for connecting a disc and a seed boot, the seed boot comprising a seed tube and a scraper, the apparatus characterized by:
    allowing for movement between the seed boot and the disc about first and second pivot axes, the apparatus comprising:
        a hinge mount top plate configured for connection to the disc;
        a hinge mount bottom plate configured for connection to the seed boot; and
        a pin connecting the hinge mount top plate and the hinge mount bottom plate, the pin having opposite first and second ends;
        wherein the first pivot axis is along a longitudinal axis of the pin; and
        wherein the first end of the pin has a fixed position relative to the hinge mount top plate, and wherein the second end of the pin has a movable position relative to the hinge mount top plate, wherein the second end of the pin is movable about the second pivot axis.

2. The apparatus of claim 1 wherein the seed boot comprises a back surface that is aligned with and positioned against a face of the disc.

3. The apparatus of claim 1 further comprising a swing stop to limit movement about the first pivot axis.

4. The apparatus of claim 1 further comprising a spindle arm on which the disc is mounted, wherein the seed boot is connected to the spindle arm.

5. The apparatus of claim 1 further comprising a biasing device that biases the hinge mount bottom plate relative to the hinge mount top plate.

6. The apparatus of claim 5 wherein the biasing device is a spring.

7. The apparatus of claim 6 wherein the spring is a helical coil spring, and wherein the pin passes through a coil of the spring.

8. The apparatus of claim 7 wherein the helical coil spring comprises first and second end arms, wherein the first end arm is positioned against the hinge mount top plate and wherein the second end arm is positioned against the hinge mount bottom plate.

9. The apparatus of claim 1 further comprising:
    a cam adjuster element comprising a top aperture, a middle aperture, and a bottom aperture;
    a first fastener passing through the top aperture to connect the cam adjuster element to the hinge mount top plate, wherein the first fastener may be disposed in different positions in the top aperture;
    a second fastener passing through the middle aperture to connect the cam adjuster element to the hinge mount top plate, wherein the cam adjuster element may pivot about a longitudinal axis of the second fastener, and wherein the second pivot axis is along the longitudinal axis of the second fastener; and
    wherein the second end of the pin is retained in the bottom aperture.

10. The apparatus of claim 9 further comprising a pin retainer that retains the second end of the pin in the bottom aperture.

11. An apparatus for connecting a disc and a seed boot, the seed boot comprising a seed tube and a scraper, the apparatus characterized by:
    allowing for movement between the seed boot and the disc about first and second pivot axes, the apparatus comprising:
        a hinge mount top plate configured for connection to the disc;
        a hinge mount bottom plate configured for connection to the seed boot;
        a pin connecting the hinge mount top plate and the hinge mount bottom plate, wherein the first pivot axis is along a longitudinal axis of the pin;
        a cam adjuster element comprising a top aperture, a middle aperture, and a bottom aperture;
        a first fastener passing through the top aperture to connect the cam adjuster element to the hinge mount top plate, wherein the first fastener may be disposed in different positions in the top aperture;
        a second fastener passing through the middle aperture to connect the cam adjuster element to the hinge mount top plate, wherein the cam adjuster element may pivot about a longitudinal axis of the second fastener, and wherein the second pivot axis is along the longitudinal axis of the second fastener; and
        wherein the pin is retained in the bottom aperture.

12. The apparatus of claim 11 further comprising a pin retainer that retains a head of the pin in the bottom aperture.

13. The apparatus of claim 12 wherein the pin retainer comprises:
    a first aperture through which the first fastener passes; and
    a second aperture through which the second fastener passes.

14. The apparatus of claim 11 wherein the seed boot comprises a back surface that is aligned with and positioned against a face of the disc.

15. The apparatus of claim 11 further comprising a swing stop to limit movement about the first pivot axis.

16. The apparatus of claim 11 further comprising a spindle arm on which the disc is mounted, wherein the seed boot is connected to the spindle arm.

17. The apparatus of claim 11 further comprising a biasing device that biases the hinge mount bottom plate relative to the hinge mount top plate.

18. The apparatus of claim 17 wherein the biasing device is a spring.

19. The apparatus of claim 18 wherein the spring is a helical coil spring, and wherein the pin passes through a coil of the spring.

20. The apparatus of claim 19 wherein the helical coil spring comprises first and second end arms, wherein the first end arm is positioned against the hinge mount top plate and wherein the second end arm is positioned against the hinge mount bottom plate.

\* \* \* \* \*